United States Patent
Bono et al.

(10) Patent No.: US 11,624,329 B2
(45) Date of Patent: Apr. 11, 2023

(54) DIESEL PARTICULATE FILTER REGENERATION

(71) Applicant: Johnson Matthey Public Limited Company, London (GB)

(72) Inventors: Robert Paul Bono, San Diego, CA (US); Anthony Ferraro, Audubon, PA (US); Marc Jayme Rost, Audubon, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 17/449,270

(22) Filed: Sep. 29, 2021

(65) Prior Publication Data
US 2022/0099039 A1    Mar. 31, 2022

Related U.S. Application Data

(60) Provisional application No. 63/085,420, filed on Sep. 30, 2020.

(51) Int. Cl.
| | |
|---|---|
| *F02D 41/02* | (2006.01) |
| *F02D 29/06* | (2006.01) |
| *F02D 41/14* | (2006.01) |
| *F01N 3/023* | (2006.01) |
| *F01N 11/00* | (2006.01) |
| *F01N 9/00* | (2006.01) |

(52) U.S. Cl.
CPC ........... *F02D 41/029* (2013.01); *F01N 3/023* (2013.01); *F01N 9/002* (2013.01); *F01N 11/002* (2013.01); *F02D 29/06* (2013.01); *F02D 41/1446* (2013.01); *F02D 41/1448* (2013.01); *F01N 2900/1406* (2013.01); *F01N 2900/1606* (2013.01); *F02D 2041/026* (2013.01)

(58) Field of Classification Search
CPC .... F02D 41/029; F02D 29/06; F02D 41/1446; F02D 41/1448; F02D 2041/026; F01N 3/023; F01N 9/002; F01N 11/002; F01N 2900/1406; F01N 2900/1606
See application file for complete search history.

(56) References Cited

U.S. PATENT DOCUMENTS 6,422,001 B1 * 7/2002 Sherman ............... B60W 20/00
903/903

\* cited by examiner

*Primary Examiner* — Audrey B. Walter

(57) ABSTRACT

Disclosed are methods and systems for monitoring a diesel generator system that includes a DPF filter in order to provide a highly efficient approach for monitoring the status of a DPF filter in order to determine if a regeneration is required. The methods and systems not only permit the ongoing determination of when a regeneration is appropriate in order to prevent excessive engine backpressure, but also accomplish this objective in a manner that reduces fuel consumption over the course of engine use.

19 Claims, No Drawings

DIESEL PARTICULATE FILTER REGENERATION

TECHNICAL FIELD

The present disclosure pertains to methods and systems for monitoring the need for and effecting regeneration of particulate filters associated with diesel engines, including stationary diesel engines that are used, for example, for back-up power generation.

BACKGROUND

Internal combustion engines including diesel engines produce a number of combustion products including particulates ("PM"), hydrocarbons ("HC"), carbon monoxide ("CO"), oxides of nitrogen ("NOx"), oxides of sulfur ("SOx") and others. Diesel particulate filters, such as catalyzed soot filters, close coupled catalysts, and others, can be used to trap particulates and reduce emissions from diesel exhaust.

In order to reduce the accumulation of particulate matter or soot on a filter, the filter is exposed to high temperatures by either increasing the engine load to increase temperature of the exhaust gas passing through the filter or by injecting fuel in the vicinity of the filter causing combustion. The combination of a catalyst and high temperature in the filter allows the accumulated soot to react with $NO_2$, converting it to carbon dioxide and thereby regenerating the filter. Active and passive regeneration of particulate filters associated with mobile diesel engines are easily achieved due to the high operating temperatures during normal operation and the sophisticated control systems typically incorporated in mobile systems, such as those found in automobiles. However, the same may not be true of stationary diesel engines.

Soot accumulation occurs at low load or low operating temperatures of a diesel engine, such as during cold starts. This is particularly a problem for stationary diesel engines which are used for back-up power generation. Back-up generators are used infrequently and typically are oversized for the facility for which they supply power, so that should the facility expand, a replacement generator will not be needed to meet any increase in power demand. Therefore, such stationary diesel engines operate at low load and do not generate the high exhaust temperatures during normal operation needed for filter regeneration. Many local ordinances require the regular inspection of back-up generators to determine whether they are working properly. The inspection involves turning on the generator for a short period of time periodically to ensure that the generator is operational. Therefore, the regular maintenance of stationary generators demanded by local legislation also contributes to soot accumulation.

SUMMARY

Provided herein are methods of monitoring a regeneration status of a diesel particulate matter filter within a diesel generator system that further includes a diesel generator, a diesel particulate filter monitor, and a load bank that includes a load bank controller, the method comprising: activating the diesel generator; detecting activation of the diesel generator; using detection of the activation to commence adding electrical load in predetermined increments by the load bank to the diesel generator, wherein the incremental addition of electrical load continues until the total electrical load on the diesel generator reaches the maximum load of the load bank or higher, and wherein the total electrical load on the diesel generator reaches at least the maximum load within a preset period of time; measuring the temperature of exhaust from the diesel generator and engine back pressure using the diesel particulate filter monitor while the diesel generator is operating at the maximum load or higher; determining whether measured back pressure exceeds a reference back pressure value; and, if the measured back pressure does not exceed the reference back pressure value, decreasing electrical load on the generator until the load imposed by the load bank reaches a predetermined minimal load, and, if the measured back pressure does exceed the reference back pressure value, using the load bank to maintain an electrical load on the diesel generator that is effective to regenerate the diesel particulate filter.

Also disclosed are systems comprising a diesel generator, diesel particulate matter filter, a diesel particulate filter monitor, and a load bank that includes a load bank controller, wherein said system is configured such that upon activation of the diesel generator, the system detects activation of the diesel generator, and the detection of the activation induces the system to begin adding electrical load in predetermined increments by the load bank to the diesel generator, wherein the incremental addition of electrical load continues until the total electrical load on the diesel generator reaches the maximum load of the load bank or higher, and wherein the total electrical load on the diesel generator reaches at least the maximum load within a preset period of time; said system being further configured to measure the temperature of exhaust from the diesel generator and engine back pressure using the diesel particulate filter monitor while the diesel generator is operating at the maximum load or higher; and said system further comprises a programmable logic controller that determines whether measured back pressure exceeds a reference back pressure value, and if the measured back pressure does not exceed the reference back pressure value, the load bank controller decreases electrical load on the generator until the load imposed by the load bank reaches a predetermined minimal load, and, if the measured back pressure does exceed the reference back pressure value, the load bank controller maintains an electrical load on the diesel generator that is effective to regenerate the diesel particulate filter.

DETAILED DESCRIPTION OF ILLUSTRATIVE EMBODIMENTS

The presently disclosed inventive subject matter may be understood more readily by reference to the following detailed description taken in connection with the accompanying examples, which form a part of this disclosure. It is to be understood that these inventions are not limited to the specific methods, systems, or parameters described and/or shown herein, and that the terminology used herein is for the purpose of describing particular embodiments by way of example only and is not intended to be limiting of the claimed inventions.

The entire disclosures of each patent, patent application, and publication cited or described in this document are hereby incorporated herein by reference.

As employed above and throughout the disclosure, the following terms and abbreviations, unless otherwise indicated, shall be understood to have the following meanings.

In the present disclosure the singular forms "a," "an," and "the" include the plural reference, and reference to a particular numerical value includes at least that particular value, unless the context clearly indicates otherwise. Thus, for example, a reference to "a generator" is a reference to one or more of such components and equivalents thereof known to those skilled in the art, and so forth. Furthermore, when indicating that a certain element "may be" X, Y, or Z, it is not intended by such usage to exclude in all instances other choices for the element.

When values are expressed as approximations, by use of the antecedent "about," it will be understood that the particular value forms another embodiment. As used herein, "about q" (where q is a numerical value) preferably refers to ±10% of the recited value, inclusive. For example, the phrase "about 8" can refer to a value of 7.2 to 8.8, inclusive. This value may include "exactly 8". Where present, all ranges are inclusive and combinable. For example, when a range of "1 to 5" is recited, the recited range should be construed as optionally including ranges "1 to 4", "1 to 3", "1-2", "1-2 & 4-5", "1-3 & 5", and the like. In addition, when a list of alternatives is positively provided, such a listing can also include embodiments where any of the alternatives may be excluded. For example, when a range of "1 to 5" is described, such a description can support situations whereby any of 1, 2, 3, 4, or 5 are excluded; thus, a recitation of "1 to 5" may support "1 and 3-5, but not 2", or simply "wherein 2 is not included."

Diesel Particulate Filters (DPF) trap particulate matter that is emitted from power producing diesel engines (such as diesel generators), with the intention of reducing diesel exhaust gas pollution via particulate matter, carbon monoxide, and hydrocarbons. As the DPF traps particulate matter over time during the operation of the diesel engine, the restriction of porosity within the filter, caused by the trapped particulate matter, slowly increases back pressure across the DPF unit, and thus increases the back pressure on the diesel engine. When the back pressure across the DPF increases to a point that is near the maximum allowable diesel engine back pressure, the particulate matter (sometimes referred to as soot) must be oxidized into $CO_2$ and water vapor and thus removed or burned-out or cleaned from the DPF in order to reduce engine back pressure to safe levels. The diesel engine can suffer damage or forced shutdown if the DPF back pressure is allowed to persist in the absence of a burning or cleaning step (referred to in the industry as "regeneration").

The presently disclosed methods and systems not only permit the ongoing determination of when a regeneration is appropriate in order to prevent excessive engine backpressure, but also accomplish this objective in a manner that, as described more fully herein, reduces fuel consumption over the course of engine use. The presently disclosed methods and systems restrict DPF regeneration to instances in which a determination of undesirably high back pressure is actually made (as opposed to on a pre-scheduled basis or only when the engine suffers from suboptimal performance as a result of high back pressure that has increased over time), such that the fuel consumption that is required for each episode of regeneration is minimized, while maintaining the DPF in a condition that will not result in damage to or shutdown of the engine over the course of its use. By avoiding engine damage, the disclosed methods and systems enable improved operation of the engine generator for the duration of the equipment's lifetime, thereby providing the end user with enhanced reliability and more time during which the generator system is operational. The present methods and systems also ensure better engine maintenance, more reliable power production, and enhance system lifespan because they involve operating the engine at beneficially high loads during DPF regeneration.

Accordingly, provided herein are methods of monitoring a regeneration status of a diesel particulate matter filter within a diesel generator system that further includes a diesel generator, a diesel particulate filter monitor, and a load bank that includes a load bank controller, the method comprising: activating the diesel generator; detecting activation of the diesel generator; using detection of the activation to commence adding electrical load in predetermined increments by the load bank to the diesel generator, wherein the incremental addition of electrical load continues until the total electrical load on the diesel generator reaches the maximum load of the load bank or higher, and wherein the total electrical load on the diesel generator reaches at least the maximum load within a preset period of time; measuring the temperature of exhaust from the diesel generator and engine back pressure using the diesel particulate filter monitor while the diesel generator is operating at the maximum load or higher; determining whether measured back pressure exceeds a reference back pressure value; and, if the measured back pressure does not exceed the reference back pressure value, decreasing electrical load on the generator until the load imposed by the load bank reaches a predetermined minimal load, and, if the measured back pressure does exceed the reference back pressure value, using the load bank to maintain an electrical load on the diesel generator that is effective to regenerate the diesel particulate filter.

Also disclosed are systems comprising a diesel generator, diesel particulate matter filter, a diesel particulate filter monitor, and a load bank that includes a load bank controller, wherein said system is configured such that upon activation of the diesel generator, the system detects activation of the diesel generator, and the detection of the activation induces the system to begin adding electrical load in predetermined increments by the load bank to the diesel generator, wherein the incremental addition of electrical load continues until the total electrical load on the diesel generator reaches the maximum load of the load bank or higher, and wherein the total electrical load on the diesel generator reaches at least the maximum load within a preset period of time; said system being further configured to measure the temperature of exhaust from the diesel generator and engine back pressure using the diesel particulate filter monitor while the diesel generator is operating at the maximum load or higher; and said system further comprises a programmable logic controller that determines whether measured back pressure exceeds a reference back pressure value, and if the measured back pressure does not exceed the reference back pressure value, the load bank controller decreases electrical load on the generator until the load imposed by the load bank reaches a predetermined minimal load, and, if the measured back pressure does exceed the reference back pressure value, the load bank controller maintains an electrical load on the diesel generator that is effective to regenerate the diesel particulate filter.

The present methods and systems represent a new approach for testing and also monitoring a DPF unit concerning when regeneration is necessary, and doing so in a manner to optimizes energy (diesel fuel) usage as well as operational usage (improved operating capacity and reliability). Whenever the diesel generator is turned on, the inventive system quickly ramps up engine load as dictated by internal system programming to the maximum value the system will allow, and then determines if engine back pressure is too close to the maximum allowable for the particular engine in use. If it is too close, the programming of the load bank will keep the engine load sufficiently high to induce a regeneration event for a minimum amount of time (i.e., such that there is minimum engine fuel usage) and then ramp down the engine load when regeneration is complete. If, pursuant to the assessment stage, the back pressure is not too close to the maximum engine allowable after being ramped up to the highest load possible, then the load is minimized and the engine runs as needed and at the minimal load necessary for power requirements (again, in a manner that minimizes fuel usage).

Pursuant to the presently disclosed methods and systems, the load bank controller or the diesel particulate filter (DPF) monitor may be configured to perform one or more of the steps of: detecting the activation of the diesel generator, measuring the temperature of exhaust from the diesel generator and engine back pressure using the diesel particulate filter monitor while the diesel generator is operating at the maximum load or higher; and, determining whether the measured back pressure exceeds a reference back pressure value. In some embodiments, the load bank controller performs each of these steps. In other embodiments, the DPF monitor performs these steps, and depending on the results of the performance of the steps, can send appropriate instructions to the load bank controller. For example, when the DPF monitor performs these steps, it will subsequently provide instructions to the load bank controller to decrease electrical load on the generator until the load imposed by the load bank reaches a predetermined minimal load if the measured back pressure does not exceed the reference back pressure value; or, if the measured back pressure does exceed the reference back pressure value, the DPF monitor will provides instructions to the load bank controller to maintain an electrical load on the diesel generator that is effective to regenerate the diesel particulate filter. The predetermined minimal load and the electrical load that is effective to regenerate the DPF is established according to the specifications of the particular diesel generator in use, and can readily be determined by those of ordinary skill in the pertinent field.

In still other embodiments, the DPF monitor performs one or more but fewer than all of these steps, and the load bank controller performs the remaining step(s).

The load bank controller or the DPF monitor may include a programmable logic controller (PLC). The PLC may be configured (programmed) to perform any of the aforementioned functions of detecting the activation of the diesel generator, measuring the temperature of exhaust from the diesel generator and engine back pressure using the diesel particulate filter monitor while the diesel generator is operating at the maximum load or higher; and, determining whether the measured back pressure exceeds a reference back pressure value.

Whether it is the DPF monitor or the load bank controller that detects activation of the generator, the detection of the activation induces the system to begin adding electrical load in predetermined increments by the load bank to the diesel generator, wherein the incremental addition of electrical load continues until the total electrical load on the diesel generator reaches the maximum load of the load bank or higher, and wherein the total electrical load on the diesel generator reaches at least the maximum load within a preset period of time.

The load increments that are added by the load bank to the diesel generator when activation of the generator is detected can be set according to the particular characteristics of the system being used. For example, if the maximum load of the load bank is x kW, and the preset period of time by which the diesel generator is to reach maximum load is one minute and the load is increased every ten seconds, then each load increment will be x/6 kW. If the preset period of time by which the diesel generator is to reach maximum load is two minutes, then each load increment will be x/12 kW. The preset period of time by which the diesel generator is to reach maximum load may be set as desired by the user, but is preferably equal to or less than 4 minutes, 3 minutes, 2 minutes, 1 minute, or 30 seconds.

In some embodiments, the incremental addition of electrical load continues until the total electrical load on the diesel generator reaches higher than the maximum load of the load bank, in which case a similar calculation can be made using the desired load as the factor by which the load increments are determined. For example, the incremental addition of electrical load may continue until the total electrical load on the diesel generator reaches about 5, 10, 15, 20, 25, 30, 35, 40, 45, or 50% higher than the maximum load of the load bank. In certain embodiments, the diesel generator system supplies energy to a manufacturing plant, and the incremental addition of electrical load continues until the total electrical load on the diesel generator reaches the sum of the maximum load of the load bank and the electrical load of the facility to which the generator provides power, e.g., a manufacturing plant.

If, at any point in during the period of incremental addition of electrical load on the generator, an engine alarm, or load-bank alarm, or DPF monitor alarm occurs, the load-bank will quickly step-wise turn off and signal an alarm (e.g., dry contact, on/off relay alarm) to warn the operator/plant that some sort of problem has occurred.

When the desired load is reached (whether the maximum load of the load bank or a load that exceeds the maximum load), and if no alarm occurs, the system uses the diesel particulate filter monitor to measure the temperature of the exhaust from the diesel generator and engine back pressure while the diesel generator continues to operate at the maximum load or higher. In some embodiments, the system via the DPF monitor obtains multiple measurements of the temperature of the exhaust from the diesel generator and multiple measurements of the engine back pressure while the diesel generator operates at the maximum load or higher. The system (e.g., the DPF monitor) may determine if the multiple measurements of exhaust temperature, engine back pressure, or both are stable over time. If the system determines that the multiple measurements of exhaust temperature, engine back pressure, or both are stable over time, then the determination of whether a measured back pressure exceeds a reference back pressure. The reference back pressure may represent a back pressure value that is standard under the tested conditions for the particular equipment present in the system. Alternatively, the reference back pressure may represent a stored value (e.g., stored in the programmable logic controller) resulting from prior measurement(s) of back pressure on the diesel generator when the DPF was newly installed in the system. In another embodiment, the reference back pressure may represent a stored value (e.g., stored in the programmable logic controller) resulting from prior measurement(s) of back pressure on the diesel generator following regeneration of the DPF, such as from the first time the generator is operated following a prior regeneration.

Pursuant to comparing engine back pressure that is measured while the total electrical load on the diesel generator is at the maximum load of the load bank or higher to a reference back pressure, the measured back pressure may be compared to a value X that represents the square root of the load on the diesel generator divided by 100, multiplied by a maximum allowable back pressure value (i.e., for the particular engine being used), as represented by Formula I:

$$X = \left(\sqrt[2]{\text{engine load}/100}\right) \times (\text{max. allowable back pressure}).$$ [Formula I]

As indicated supra, once the comparison between the measured engine back pressure and the reference back pressure is performed, a determination is made as to whether the measured engine back pressure exceeds the reference back pressure. If the measured engine back pressure does not exceed the reference back pressure, then the system has effectively determined that a regeneration of the DPF is not required. The system (specifically, the load bank controller) responds by decreasing the electrical load on the generator until the load imposed by the load bank reaches predetermined minimal load, which may be zero or some other value. The predetermined minimal load may be predetermined by the end-user or installer of the system. The actual value of the predetermined minimum load, whether zero load or some other small percentage of generator capacity, is not critical to the overall system performance, but the lower the value, the higher the amount of energy (fuel) that is conserved.

If the measured engine back pressure does exceed the reference back pressure, the load bank controller maintains an electrical load on the diesel generator that is effective to regenerate the diesel particulate filter. The load that is effective to regenerate the DPF may be a preset load that was configured to be the optimal load for regeneration when the system was installed. This optimal load varies from engine/generator to engine/generator, but can readily be determined by the engine generator's exhaust data vs. load.

Hereinafter, the present disclosure will be described in more detail through Example, which is intended to be illustrative to the present disclosure. The present disclosure is not limited to the Example.

Example 1

A 3000 kW diesel standby generator with a Johnson Matthey Model SDPF-24-N-BITO-CS-24/24-RT DPF installed with a 1500 kW load-bank installed and connected between the generator and the DPF monitor (for example, a SootAlert™ monitor, as descried in U.S. Pat. No. 9,765,763, incorporated herein by reference). Every time this generator is turned on, the load-bank controller ramps up the engine generator to a 1500 kW load in steps of 250 kW within a one-minute period (i.e., approximately once every 10 seconds the load-bank increase 250 kW more in load, so that from zero load to 1500 kW load, about one minute elapses).

When the load reaches 1500 kW, the load-bank controller captures the back pressure reading and exhaust temperature reading from the DPF monitor and for about 15 seconds more it determines if they are acceptably stable (e.g., they do not deviate by more than 5%). Once the readings are determined to be stable within 5%, the load bank compares the stable back pressure reading it has been capturing from the DPF monitor and makes a Programmable Logic Controller (PLC) calculation per the X formula, defined as follows:

$$X = \left(\sqrt[2]{\text{engine load}/100}\right) \times (\text{max. allowable back pressure}).$$

If the formula yields a value that is more than the measured engine back pressure, then the load-bank quickly ramps down (preferably in less than 1 minute typical) to either a zero electrical load or to a preset low load.

During the described startup and ramp-up and comparison the DPF monitor has captured the exhaust temperature and back pressure readings as part of its normal DPF monitor programming. This then becomes a historical log of every time the generator starts up and what was the back pressure at the time of highest ramp up. This historical data is tracked within the DPF monitor, which also includes a program logic to watch for any excessive back pressure as a function of load. That logic (algorithm) inside the DPF monitor works in the same way/manner as the "X-formula" logic in the load-bank controller, but instead of assessing the instantaneous stable back pressure of the current startup, it assesses the running average back pressure at the particular load taking place during the current generator startup. In this way, the DPF monitor (X formula) result is effectively double-checked and also becomes more accurate than the load bank logical decision. If the DPF monitor detects that the X formula result as a function of historical data is abnormal, then a warning from the DPF monitor is issued in order to alert the plant operator that the DPF system should be evaluated for further action and/or checks to ensure it is functioning properly and will not overpressure at highest operating load.

What is claimed:

1. A method of monitoring a regeneration status of a diesel particulate matter filter within a diesel generator system that further includes a diesel generator, a diesel particulate filter monitor, and a load bank that includes a load bank controller, the method comprising:
    activating the diesel generator;
    detecting activation of the diesel generator;
    using detection of the activation to commence adding electrical load in predetermined increments by the load bank to the diesel generator, wherein the incremental addition of electrical load continues until the total electrical load on the diesel generator reaches the maximum load of the load bank or higher, and wherein the total electrical load on the diesel generator reaches at least the maximum load within a preset period of time;
    measuring the temperature of exhaust from the diesel generator and engine back pressure using the diesel particulate filter monitor while the diesel generator is operating at the maximum load or higher;
    determining whether measured back pressure exceeds a reference back pressure value, wherein the reference back pressure value represents a stored value resulting from a prior measurement of back pressure on the diesel generator when the diesel particulate filter was newly installed in the system, or immediately following regeneration of the diesel particulate filter; and,
    if the measured back pressure does not exceed the reference back pressure value, decreasing electrical load on the generator until the load imposed by the load bank reaches a predetermined minimal load, and,
    if the measured back pressure does exceed the reference back pressure value, using the load bank to maintain an electrical load on the diesel generator that is effective to regenerate the diesel particulate filter.

2. The method according to claim 1, wherein load bank controller detects the activation of the diesel generator.

3. The method according to claim 1, wherein the load bank controller performs the step of measuring the temperature of exhaust from the diesel generator and engine back pressure using the diesel particulate filter monitor while the diesel generator is operating at the maximum load or higher.

4. The method according to claim 1, wherein the load bank controller performs the step of determining whether the measured back pressure exceeds the reference back pressure value.

5. The method according to claim 1, wherein the diesel generator system supplies energy to a manufacturing plant, and the incremental addition of electrical load continues until the total electrical load on the diesel generator reaches the sum of the maximum load of the load bank and the electrical load of the manufacturing plant.

6. The method according to claim 1, wherein the total electrical load on the diesel generator reaches the maximum load of the load bank within two minutes or less.

7. The method according to claim 6, wherein the total electrical load on the diesel generator reaches the maximum load of the load bank within one minute or less.

8. The method according to claim 1, wherein the diesel particulate filter monitor detects the activation of the diesel generator, and subsequently provides notification of the activation to the load bank controller.

9. The method according to claim 8, wherein the diesel particulate filter monitor performs the step of measuring the temperature of exhaust from the diesel generator and engine back pressure using the diesel particulate filter monitor while the diesel generator is operating at the maximum load or higher.

10. The method according to claim 9, wherein the diesel particulate filter monitor performs the step of determining whether the measured back pressure exceeds the reference back pressure value.

11. The method according to claim 10, wherein the diesel particulate filter monitor provides instructions to the load bank controller to decrease electrical load on the generator until the load imposed by the load bank reaches a predetermined minimal load if the measured back pressure does not exceed the reference back pressure value, and wherein the diesel particulate filter monitor provides instructions to the load bank controller to maintain an electrical load on the diesel generator that is effective to regenerate the diesel particulate filter if the measured back pressure does exceed the reference back pressure value.

12. The method according to claim 1, further comprising obtaining multiple measurements of the temperature of exhaust from the diesel generator and multiple measurements of the engine back pressure using the diesel particulate filter monitor while the diesel generator is operating at the maximum load or higher.

13. The method according to claim 12, further comprising determining if the multiple measurements of temperature and engine back pressure are stable over time.

14. The method according to claim 13, wherein the step of determining whether measured back pressure exceeds the reference back pressure value is performed after the multiple measurements of temperature and engine back pressure are determined to be stable over time.

15. The method according to claim 14, wherein the measured engine back pressure that is determined to be stable over time is compared to a value X that represents the square root of the load of the diesel generator divided by 100, multiplied by a maximum allowable back pressure value, as represented by Formula I:

$$X = \left( \sqrt[2]{(\text{engine load}/100)} \times (\text{max. allowable back pressure}) \right). \quad [\text{Formula I}]$$

16. The method according to claim 15, wherein the step of decreasing electrical load on the generator until the load imposed by the load bank reaches a predetermined minimal load is performed if the measured engine back pressure that is determined to be stable over time is less than the value X.

17. A system comprising a diesel generator, diesel particulate matter filter, a diesel particulate filter monitor, and a load bank that includes a load bank controller, wherein said system is configured to detects activation of the diesel generator, wherein the system is configured to add electrical load in predetermined increments by the load bank to the diesel generator in response to the detection of the activation of the diesel generator, wherein system is configured to continue with the incremental addition of electrical load until the total electrical load on the diesel generator reaches the maximum load of the load bank or higher, and wherein the system is configured such that total electrical load on the diesel generator reaches at least the maximum load within a preset period of time;

said system being further configured to measure the temperature of exhaust from the diesel generator and engine back pressure using the diesel particulate filter monitor while the diesel generator is operating at the maximum load or higher; and said system further comprises a programmable logic controller that determines whether measured back pressure exceeds a reference back pressure value, wherein the reference back pressure value represents a stored value resulting from a prior measurement of back pressure on the diesel generator when the diesel particulate filter was newly installed in the system, or immediately following regeneration of the diesel particulate filter; and if the measured back pressure does not exceed the reference back pressure value, the load bank controller decreases electrical load on the generator until the load imposed by the load bank reaches a predetermined minimal load, and, if the measured back pressure does exceed the reference back pressure value, the load bank controller maintains an electrical load on the diesel generator that is effective to regenerate the diesel particulate filter.

18. The system according to claim 17, wherein the programmable logic controller is located in the diesel particulate filter monitor.

19. The system according to claim 17, wherein the programmable logic controller is located in the load bank controller.

* * * * *